(No Model.) 2 Sheets—Sheet 1.
S. ALLEY.
DEVICE FOR WELDING BOILERS, &c.
No. 294,179. Patented Feb. 26, 1884.
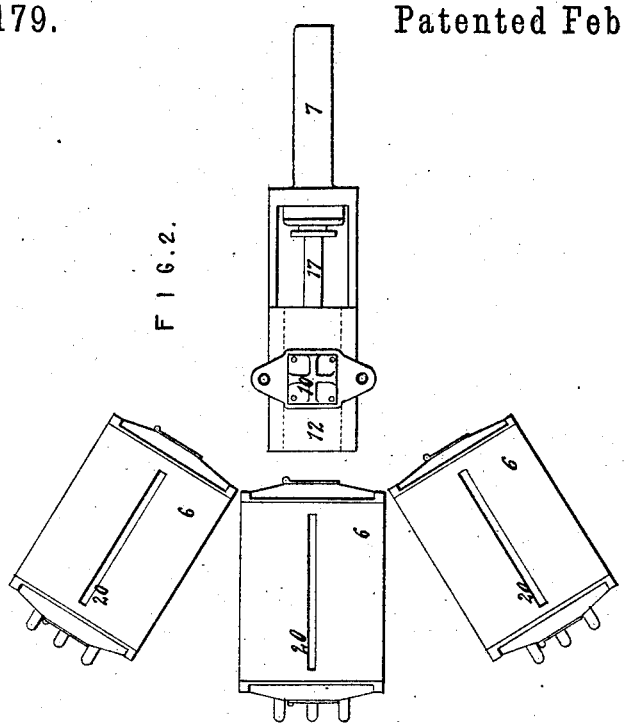
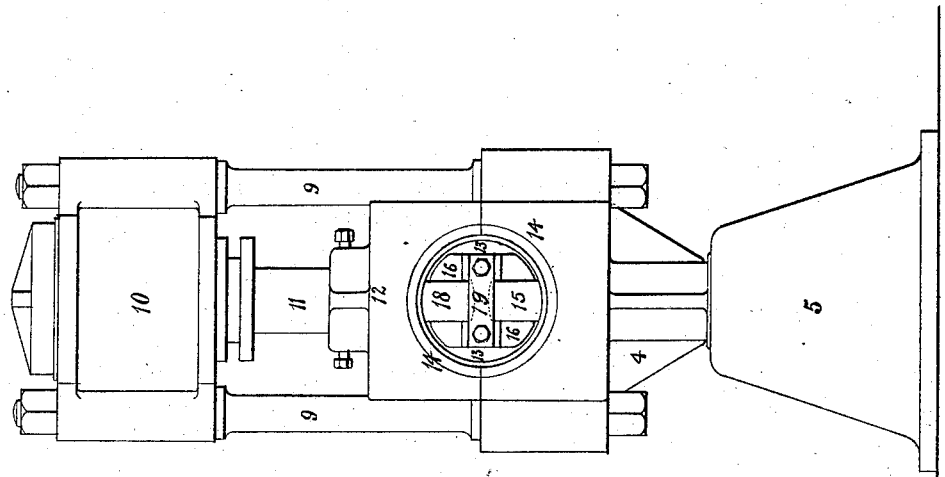
Witnesses
James F. Tobin
John M. Clayton
Inventor
Stephen Alley
by his Attorneys
Howson & Sons

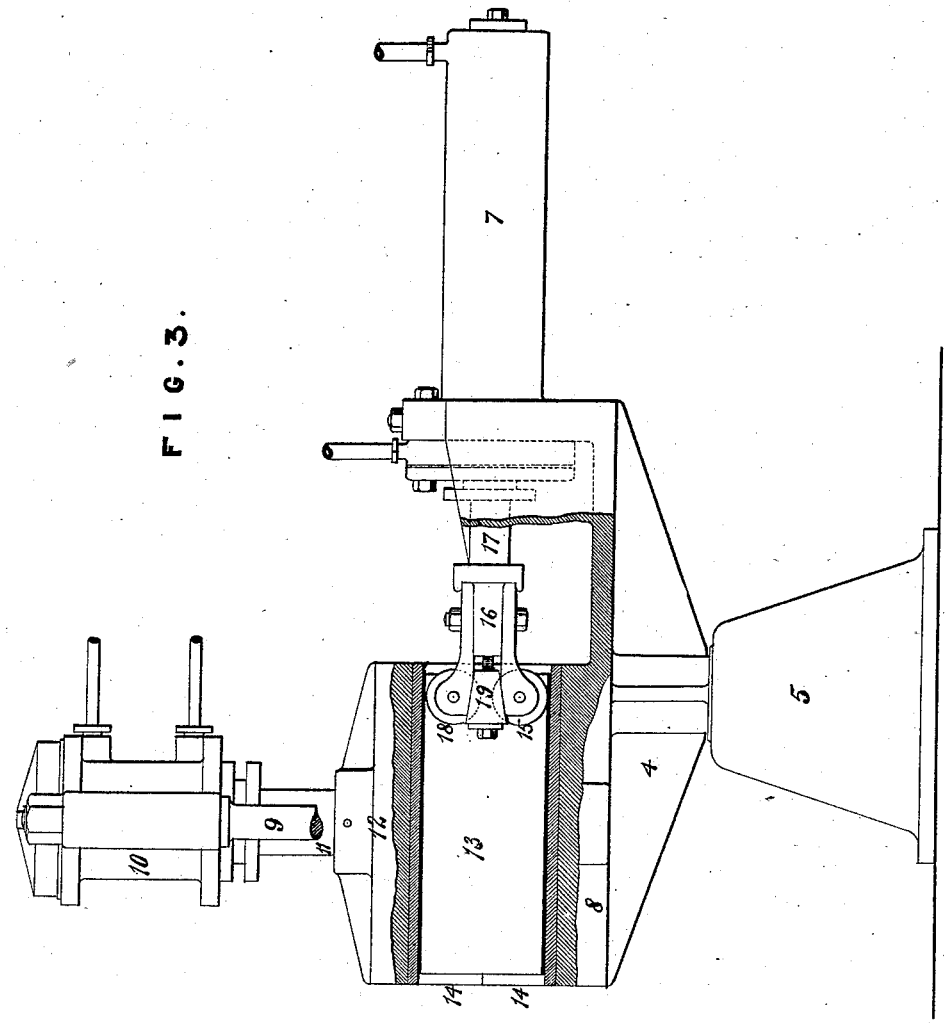

UNITED STATES PATENT OFFICE.

STEPHEN ALLEY, OF GLASGOW, COUNTY OF LANARK, SCOTLAND.

DEVICE FOR WELDING BOILERS, &c.

SPECIFICATION forming part of Letters Patent No. 294,179, dated February 26, 1884.

Application filed October 2, 1883. (No model.) Patented in England January 5, 1883, No. 69.

*To all whom it may concern:*

Be it known that I, STEPHEN ALLEY, a subject of the Queen of Great Britain and Ireland, and residing at Glasgow, in the county of Lanark, Scotland, have invented certain Improvements in Apparatus to be Used in Welding Boiler and other Shells of Cylindrical and other Forms, (for which I have obtained a patent in Great Britain, dated January 5, 1883, No. 69,) of which the following is a specification.

My said invention has for its object to simplify, improve, and cheapen the operations of forming cylindrical and other shells for boilers and other vessels or parts thereof.

In carrying out my invention when forming a shell, the sheet of iron or steel, having been bent into the desired form, is heated at the edges which have to be welded together, and is then placed in a machine or apparatus arranged with parts for confining it so as to prevent enlargement of its diameter, such apparatus having also a part or parts to be applied to the outside of the joint to resist the welding-pressure. The welding operation is effected by means of a roller fitted to the outer end of the ram of a hydraulic cylinder, the ram having also fitted to its end a second roller arranged to bear on the interior of the shell at a part diametrically opposite to the part acted on by the welding-roller. The shell having been suitably heated and placed in position in the holding or confining apparatus, water under pressure is admitted into the hydraulic cylinder, so as to force out the ram, which causes the welding-roller and the other roller to move through the cylinder, the necessary pressure of the welding-roller on the joint being maintained through the bearing of the other roller on the opposite side of the cylinder.

Figure 1 on Sheet 1 of the accompanying drawings is an end elevation of my improved welding apparatus. Fig. 2 is a plan on a reduced scale; and Fig. 3 is a sectional side elevation, corresponding to Fig. 1.

This apparatus comprises parts for holding the cylinder while being welded and parts for effecting the welding operation by passing a roller acting with considerable pressure along the joint to be welded. These parts are carried by a turn-table or frame, 4, formed with or fixed upon a pillar, 5, so as to be capable of turning about a vertical axis. This arrangement allows of one welding-machine being used conveniently in combination with a number of heating-furnaces, 6, arranged, as indicated in Fig. 2, round more or less of a circle for heating the joint-edges of the shell to be welded. On the turn-table 4 there is fixed a horizontal hydraulic cylinder, 7, and at the other end there is a block, 8, which may be formed or fixed on the turn-table, and which has a semi-cylindrical cavity formed in its upper side. Above the block 8 there is supported on pillars or bars 9 an inverted hydraulic cylinder, 10, the ram 11 of which has fixed to it an upper block, 12, having a semi-cylindrical cavity formed in its under side. When welding a cylinder, 13, of smaller size than the space between the two blocks 8 12 when closed, semi-cylindrical shells 14, of suitable thickness, are applied to the cavities in the two blocks. In Figs. 1 and 3 a cylindrical shell, 13, is represented as being welded, the weld-joint being along the bottom. The edges to be joined have been brought to a welding-heat, and the cylinder has been placed between the blocks 8 12, the upper one, 12, having been brought down by means of the hydraulic cylinder 10, so as to securely hold and confine the cylinder. The welding is effected by a roller, 15, fitted to the head 16 of the ram 17 of the horizontal hydraulic cylinder 7, the requisite pressure being obtained by the action of an upper roller, 18, also fitted to the ram-head 16, and which bears up against the inside of the top of the cylinder 13. The rollers 15 18 are held by separate bearing-pieces, which can be adjusted more or less apart by means of a wedge, 19, connected to the ram-head 16 by a pair of adjustable screw-bolts. As soon as the freshly-heated cylinder 13 has been secured between the confining-blocks 8 12, the water under pressure is admitted into the hydraulic cylinder 7, so as to move out the ram 17 and force the rollers 15 18 through the cylinder 13. The hydraulic cylinder 7 is made double-acting, and, after moving outward through the cylinder 13, the rollers 15 18 are drawn back again, after which the upper confining-block, 12, can be raised and the cylinder 13 removed. The confining of the cylinder during the welding operation is of great importance, as it prevents the spreading or thinning down of the metal under the welding-roller, and causes the pressure to act more effectually in uniting the edges of the joint. I prefer to have the joint a little open during the heating process, so that the flames may operate effectually on the edges. Afterward the action of the confining-blocks causes the edges to be forcibly pressed together.

Any suitable furnace may be used for heating the joint-edges of the cylinder 13; but that shown in Fig. 2 is simple and convenient. A narrow slot, 20, is formed in the top, from which, when the furnace is in action, the flame issues so as to play upon the joint-edges of the cylinder 13, this cylinder being then placed with the edges upon the slot 20. The grate for the fuel is made as the top of a blast-box, which is made with compartments, the air-supplies to these compartments being separately adjustable, so that the intensity of heat at different parts of the slot may be separately controllable. While a cylinder is being heated a fire-brick cover is, by preference, placed inside the cylinder over the parts being heated, to confine and economize the heat.

When welding long flue-tubes of small diameter and in similar cases, it is generally desirable to heat the entire tube in an ordinary air-furnace; and after the joint has been welded, the ram 17, with its rollers 15 18, may be turned partly round and forced through the tube a second time or oftener, to render the interior smooth at other parts besides the joint and part opposite thereto.

My improved apparatus is obviously suitable for welding shells which are of circular or of oval or of other forms in cross-section, including such as are tapered or conical longitudinally, the most important characteristic being in all applications of my invention the application of the welding-roller internally combined with the appliances for confining the shell externally, so that the welding-pressure, and especially its tendency to make the metal spread, and thereby cause an enlargement of diameter, may be effectually resisted and a good weld obtained.

What I claim in apparatus for welding boiler and other shells of cylindrical and other forms is—

1. The hydraulic cylinder and ram, the ram being fitted with two rollers, one to roll along and operate with welding-pressure on the joint, and the other to roll along the opposite part of the shell, in combination with external blocks or parts, which confine the shell and prevent its enlargement, substantially as herein set forth.

2. A hydraulic cylinder, ram, and welding-rollers, and devices applied to the outside of a shell to keep it in place, the whole mounted on a turn-table, in combination with a series of furnaces arranged radially in relation to the center of the turn-table, substantially as described.

In testimony whereof I have signed my name to this specification in the presence of two subscribing witnesses.

STEPHEN ALLEY.

Witnesses:
 EDMUND HUNT,
 D. FERGUSON.